United States Patent [19]

Fujiki et al.

[11] Patent Number: 4,603,360
[45] Date of Patent: Jul. 29, 1986

[54] ROTATABLE CYLINDER WITH PLURAL HEADS HAVING DIVERSE AZIMUTH ANGLE GAP ARRANGEMENTS

[75] Inventors: Makoto Fujiki, Tokyo; Masahide Hasegawa; Takashi Narasawa, both of Kanagawa, all of Japan

[73] Assignee: Canon Kabushiki Kaisha, Tokyo, Japan

[21] Appl. No.: 529,964

[22] Filed: Sep. 7, 1983

[30] Foreign Application Priority Data

Sep. 13, 1982 [JP] Japan .................................. 57-160160

[51] Int. Cl.⁴ .............................................. G11B 5/08
[52] U.S. Cl. ..................................... 360/84; 360/10.3; 360/76; 360/95
[58] Field of Search ................... 360/10.2, 10.3, 11.1, 360/75, 76, 83, 84, 85, 107, 70, 95

[56] References Cited

U.S. PATENT DOCUMENTS 4,486,792  12/1984  Edakubo et al. .................. 360/10.3

Primary Examiner—John H. Wolff
Assistant Examiner—Melissa J. Koval
Attorney, Agent, or Firm—Toren, McGeady, Stanger, Goldberg & Kiel

[57] ABSTRACT

In the disclosed video signal recording and reproducing apparatus, a cylinder member arranged to have a tape-shaped recording medium wound thereon, includes five rotating heads. The first head has a specific head width and azimuth angle. The second rotating head is approximately equal in head width to the first rotating head but differs from the first rotating head in azimuth angle. The third rotating head has a narrower head width than the first rotating head but is equal to the first head in azimuth angle. The fourth rotating head is approximately equal in head width to the third rotating head and equal in azimuth angle to the second rotating head and the fifth rotating head is equal in azimuth angle to the third rotating head.

12 Claims, 15 Drawing Figures

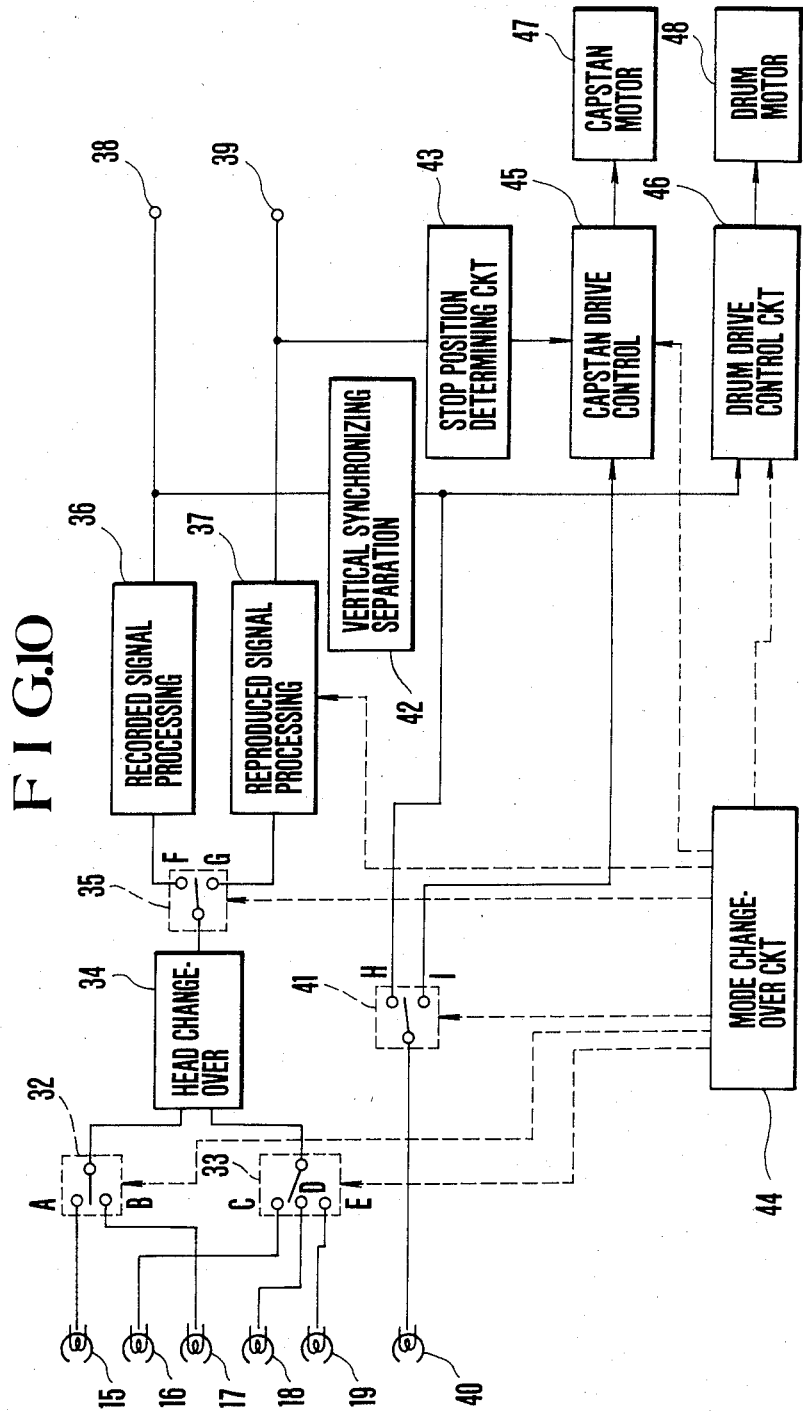

ROTATABLE CYLINDER WITH PLURAL HEADS HAVING DIVERSE AZIMUTH ANGLE GAP ARRANGEMENTS

BACKGROUND OF THE INVENTION

1. Field of the Invention

This invention relates to a video signal recording and reproducing apparatus (hereinafter called a VTR for short) of the kind having rotating heads and more particularly to a rotating head type video signal recording and reproducing apparatus capable of recording in a so-called long-time mode in which a tape-shaped recording medium is allowed to travel at a speed slower than a standard recording speed past heads of narrow width. 2. Description of the Prior Art FIG. 1 of the accompanying drawings shows an example of allocation of heads in a conventional helical scan type VTR. Heads 1 and 2 serve for recording a signal-processed video signal on a magnetic tape 3 and for reproducing the video signal from the tape. As is known, the video heads 1 and 2 are arranged at different azimuth angles for high density recording. A rotating cylinder 4 carries these video heads 1 and 2. In FIG. 1, an arrow 5 indicates a direction that the tape 3 travels for normal recording and reproduction. Another arrow 6 indicates the direction of rotation of the heads 1 and 2. The rotational speed of the heads 1 and 2 is 1800 r.p.m. where the video signals are NTSC signals.

FIG. 2 is a developement view showing the arrangement of the heads 1 and 2. The heads 1 and 2 which have different azimuth angles 1a and 2a are arranged in different positions with a phase difference of 180° and at the same height in the axial direction of rotation. Such two-head helical scan type VTR's include VTR's of the kind having two different operation modes. One is a long-time mode in which recording can be performed over a long period of time by allowing the magnetic tape 3 to travel at a low speed and the other is a standard mode (or a short-time mode) in which the magnetic tape 3 is allowed to travel at a normal speed. When the heads 1 and 2 are to be used for both the long-time mode and the standard mode in a VTR operable in two modes, the head width of these heads are determined on the basis of the tape speed for the long-time mode. In the long-time mode, the travel speed of the tape is slower than the short-time mode. Accordingly, a recordable track width is narrower in the long-time mode than in the short-time mode. The head width of the heads to be used, therefore, is determined on the basis of the narrower track width.

FIG. 3(A) shows a recording pattern formed on a tape in the long-time mode by the VTR having the head arrangement shown in FIG. 2. In FIG. 3(A), an arrow 9 indicates the travel direction of the head on the tape. Another arrow 10 indicates the travel direction of the tape. A reference numeral 11 denotes a control track on which a control signal (hereinafter called the signal CTL) is to be recorded for the purpose of controlling the travel of the tape during a reproducing operation. A numeral 12 denotes an audio track which is provided for recording an audio signal thereon. Assuming that a recording track 7a has been recorded by the head 1 shown in FIG. 1, another recording track 8a can be considered to have been recorded by the other head 2 which differs from the head 1 in azimuth angle. The signal recorded in each of the tracks 7a and 8a is a video signal covering one field. A video signal for one frame is obtained by adding up the signals recorded in the tracks 7a and 8a. Following these tracks 7a and 8a, other tracks 7b, 8b, 7c, 8c,—are formed one after another without leaving any space between them.

A recording pattern formed on a tape in the short-time mode by the VTR having the head arrangement of FIG. 2 is as shown in FIG. 3(B). Referring to FIG. 3(B), if a track 13a is recorded by the head 1 shown in FIG. 1, a next track 14a is recorded by the head 2. A one field portion of a video signal is recorded in each of the tracks 13a and 14a. One frame portion of the video signal is made up of the signals recorded in these tracks 13a and 14a. Further recording is accomplished in other tracks 13b, 14b, 13c,—,—one after another. Meanwhile, however, parts of the recording medium between these tracks are left unrecorded.

As described above, a conventional VTR capable of recording both a short-time mode and a long-time mode, leaves parts of the tape unrecorded in the short-time mode. The signal-to-noise ratio of such a VTR is inferior to that of VTR's having only a short-time mode (or the standard mode), because the head cannot reproduce the output efficiently.

Also a problem arises during reproduction at a tape speed different from that of a recording operation such as still image reproduction, slow-motion reproduction, or high speed searching reproduction. A large noise bar results from the head scanning each of the unrecorded parts left on a tape which has been recorded in the short-time mode. This degrades the thus reproduced pictures.

FIG. 4(A) shows a scanning operation of the head for still reproduction from a densely written in record (a record leaving no unrecorded space) which is recorded in the long-time mode by the conventional VTR. In this instance, no such a large noise bar occurs. For the still reproduction, the tape is stopped and the head is allowed to trace the record by straddling two tracks 7b and 8b. The tracing operation is accomplished with two heads which are normally used for recording and reproduction and are arranged to have different azimuth angles. Therefore, the record in the track which has been recorded by the head 1 shown in FIG. 1 can be reproduced solely by the head 1. The record in the track which has been recorded by the other head 2 likewise is reproducible only by the head 2. Accordingly, the output wave form becomes that shown in FIG. 4(B). As shown the reproduction output becomes extremely small at the beginning and ending parts of the tracks 7b and 8b. This inevitably degrades the signal-to-noise ratio of the reproduced output. Further, since one field of the video signal being reproduced deviates 1/60 sec. from another field in terms of time, somewhat different video signals would be alternately reproduced if the video signal recorded represents a quick motion. In such a case, the still picture thus obtained would be blurred.

SUMMARY OF THE INVENTION

In view of the problems encountered with the conventional VTR's as mentioned in the foregoing, it is an object of the present invention to provide a video signal recording and reproducing apparatus whereby pictures of good quality can be obtained both in the long-time mode and in the standard mode and reproduction at different speeds also can be accomplished in a satisfactory manner by virtue of the head arrangement of the apparatus which is suitable for all such purposes.

It is another object of the invention to provide a video signal recording and reproducing apparatus which is capable of obtaining still picture images having no blur nor noise from records recorded either in the standard mode or in the long-time mode by means of heads arranged in as small number as possible.

These and further objects and features of the invention will become apparent from the following detailed description of a preferred embodiment thereof taken in conjunction with the accompanying drawings.

BRIEF DESCRIPTION OF THE DRAWINGS

FIG. 10 is a block diagram showing the simple system of the VTR having the head arrangement as shown in FIG. 5.

DETAILED DESCRIPTION OF PREFERRED EMBODIMENT

Figure 5:
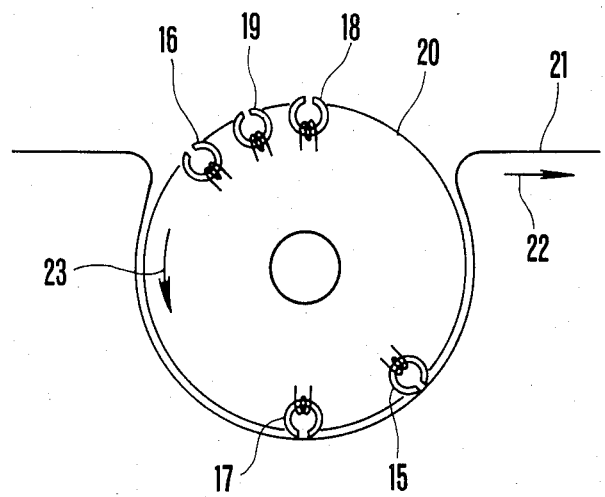
FIG. 5 is an illustration schematically showing the allocation of the heads in a VTR embodying the present invention as an embodiment example thereof.
Figure 6:
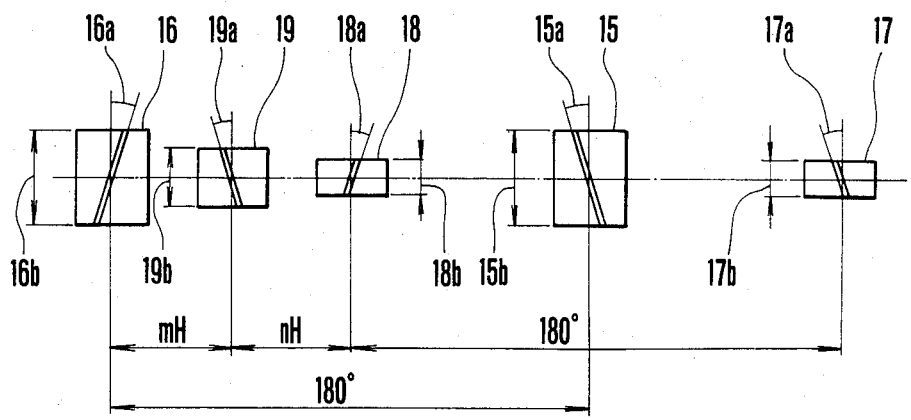
FIG. 6 is a development view showing the arrangement of the heads shown in FIG. 5.

Referring to FIG. 5 which shows the allocation of the heads of a VTR as an embodiment example of the present invention, includes a magnetic tape 21; and an arrow 22 which indicates a direction in which the tape 21 travels during normal recording and reproduction. FIG. 6 is a development view showing the arrangement of the heads whose allocation is as shown in FIG. 5. Heads 15 and 16 are provided for operation in a short-time mode. They differ in azimuth angle as indicated by azimuth angles 15a and 16a. They are arranged to be of the same height in the axial direction of rotation of a cylinder 20 and are positioned at a phase difference of 180°. The heads 15 and 16 have head widths 15b and 16b. Head width 16b is approximately equal to head width 15b. The VTR includes heads 17 and 18 for a long-time mode. The heads 17 and 18 have different azimuth angles 17a and 18a. They are arranged to be of the same height in the axial direction of the rotation and are positioned at a phase difference of 180° from each other. The heads 17 and 18 have head widths 17b and 18b. Head width 18b is approximately equal to head width 17b. There are relatively small phase differences between the heads 15 and 17 and between the heads 16 and 18. The head 15 equals the head 17 in azimuth angle while the head 16 also equals the head 18 in azimuth angle. The widths of the heads 17 and 18 for the long-time mode are naturally narrower than those of the heads 15 and 16 which are for the short-time mode.

Between the heads 16 and 18 is provided a video head 19 for special reproduction purposes. The azimuth angle of the head 19 is the same as those of the heads 15 and 17. In other words, the azimuth angle of the head 19 differs from those of the heads 16 and 18 which are disposed on both sides thereof. Further, the track width 19b of the head 19 is smaller than the widths 15b and 16b of the short-time mode heads 15 and 16 and is larger than the widths 17b and 18b of the long-time mode heads 17 and 18. The head 19 is thus arranged to be usable for special reproduction either in the long-time mode or in the short-time mode. The VTR is provided with a rotating cylinder 20 which has the heads 15-19, all secured thereto. An arrow 23 indicates the rotational direction of the heads 15-19.

Figure 7A:
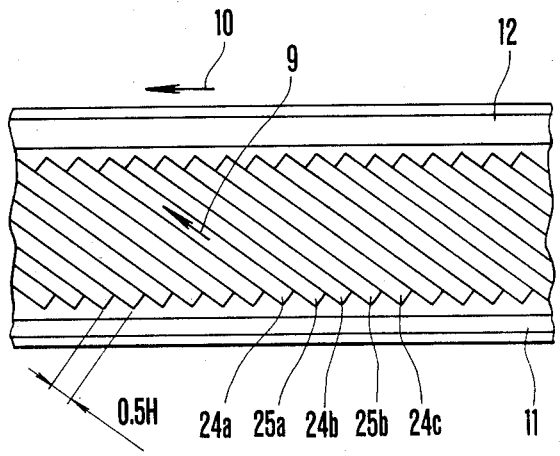
FIG. 7(A) and 7(B) are illustrations of recording patterns produced on recording tapes in a long-time mode and a short-time mode by the VTR having the heads thereof arranged as shown in FIG. 5.
Figure 7B:
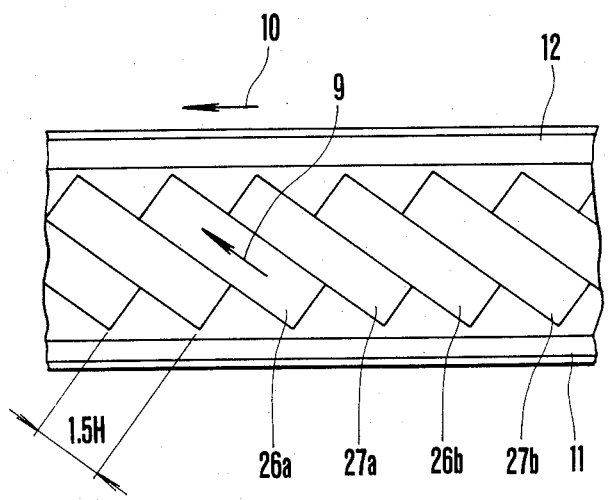

FIGS. 7(A) and 7(B) show recording patterns drawn on magnetic tapes by the heads which are arranged as shown in FIGS. 5 and 6. FIG. 7(A) shows a pattern drawn when the recording is performed in the long-time mode and FIG. 7(B) a pattern drawn when the recording is performed in the short-time mode. Referring to FIG. 7(A), if a track 24a is recorded by the head 17 shown in FIG. 6, a next track 25a is recorded by the head 18. Each of the tracks 24a and 25a has a one field portion of a video signal recorded therein. The record portions in these tracks 24a and 25a thus jointly make up one frame portion of the video signal. Following them, further recording tracks 24b, 25b, 24c,—ensue one after another without leaving any space between one track and another.

In FIG. 7(B) on the other hand, if a track 26a is recorded by the head 15, a next track 27a is recorded by the head 16. Each of these tracks also has one field portion of a video signal recorded therein. Then, one frame portion of the video signal is made up of the record portions of the tracks 26a and 27b. Further tracks 26b, 27b, 26c,—are then recorded one after another. Since the track width produced by these heads 15 and 16 are wide, these tracks can be formed without leaving any space between one track and another.

The heads are selectively used for the long-time mode and the short-time mode. The tape thus can be effectively used in either mode. It is advantageous that the output of the head can be made large so that a picture image of good quality can be obtained even in the short-time mode.

Assuming that the track length corresponding to the video signal in one horizontal scanning period is H, generally, a shifting pitch between adjoining tracks in the recording pattern drawn in the short-time mode is 1.5 H. Whereas, the track width produced in the long-time mode is generally ⅓ of that of the short-time mode. Accordingly, in the long-time mode, the shifting pitch between adjoining tracks is 0.5 H which is ⅓ of that of the short-time mode.

In still picture reproduction, obtaining the reproduced picture image without blur requires having the same track reproduced by two video heads one after another. This necessitates provision of heads of equal azimuth angles. Therefore, in the arrangement of heads shown in FIGS. 5 and 6, the heads 15 and 19 are used for still picture reproduction of tracks recorded in the short-time mode. Meanwhile, the heads 17 and 19 are used for still picutre reproduction of tracks recorded in the long-time mode. In this manner, the same field is reproduced by the two heads that have the same azimuth angle.

Figure 1:
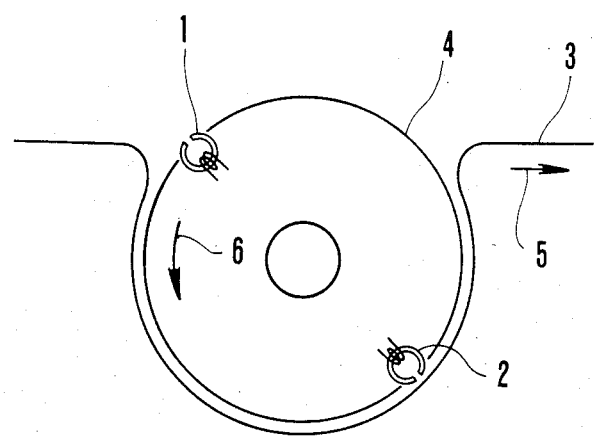
FIG. 1 is a schematic illustration showing by way of example the allocation of heads employed in a conventional helical scan type VTR.
Figure 2:
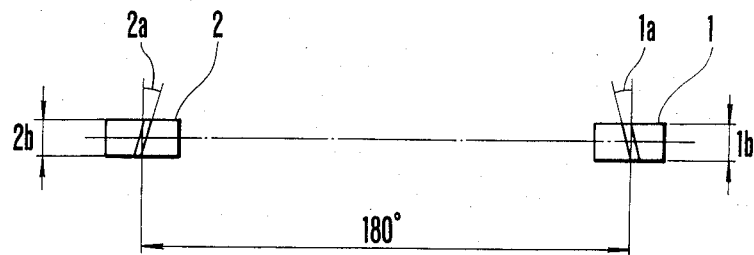
FIG. 2 is a development view showing the arrangement of the heads shown in FIG. 1.
Figure 3A:
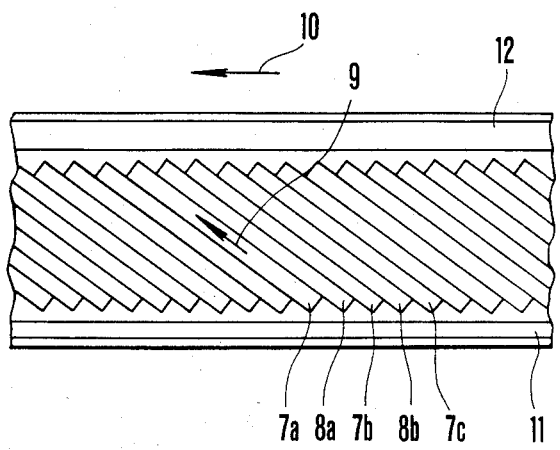
FIGS. 3(A) and 3(B) are illustrations of recording patterns produced on recording tapes in a long-time mode and a short-time mode by the VTR which has the heads thereof arranged as shown in FIG. 2.
Figure 3B:
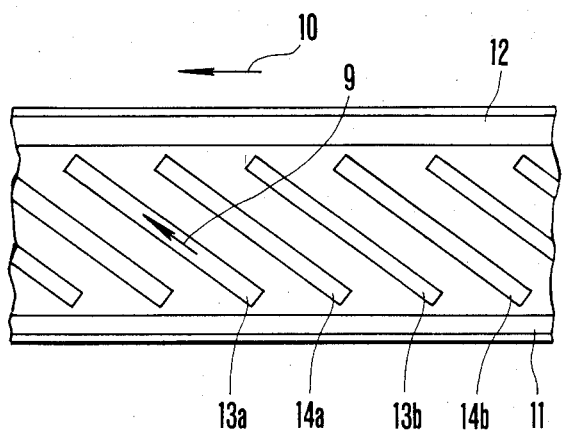
Figure 4A:
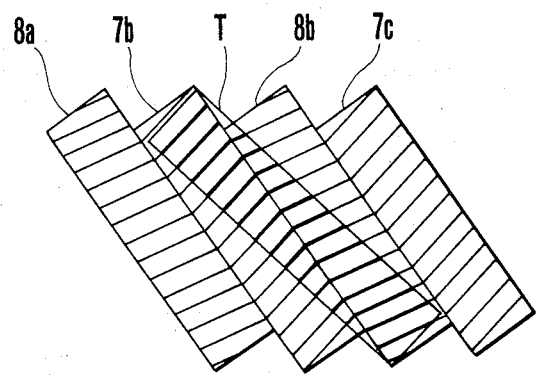
FIGS. 4(A) and 4(B) are illustrations showing a still picture image reproducing operation in the long-time mode of the VTR having the heads arranged as shown in FIG. 2.
Figure 4B:
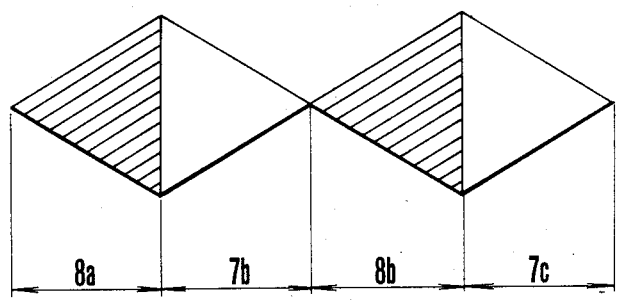
Figure 8A:
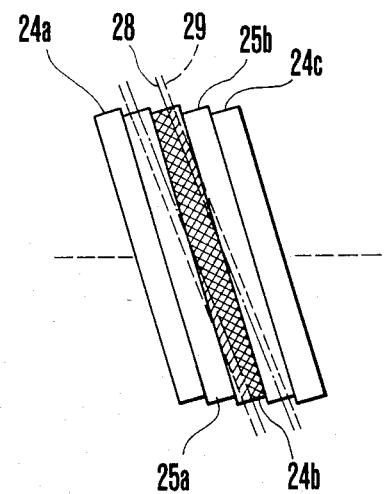
FIGS. 8(A) and 8(B) are illustrations showing a still picutre image reproducing operation in the long-time mode of the VTR having the head arrangement as shown in FIG. 5.
Figure 8B:
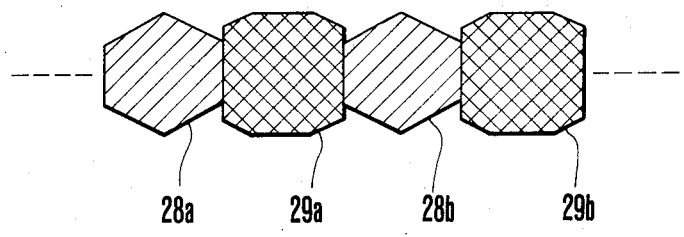

FIGS. 8(A) and 8(B) show the tracing actions being performed by the heads 17 and 19 during still picture reproduction of record tracks which have been recorded in the long-time mode. FIG. 8(A) shows a case where a still picture image is to be obtained by repeatedly reproducing the record of one field portion of a video signal recorded in a track 24b. In FIG. 8(A), one-dot chain lines 28 indicate the edges of a tracing locus of the head 17 and broken lines 29 the edges of that of the other head 19. FIG. 8(B) shows the condition of reproduction outputs resulting from the tracing actions. The head 17 produces outputs 28a and 28b while the head 19 produces outputs 29a and 29b. As apparent from the drawing, there are no extremely small output parts such as those shown in FIG. 4(B). Therefore, a sharp still picture image which is free from noise is reproduced. Further, since it is only the same signal that is repeatedly reproduced, the picture image never blurs.

Figure 9A:
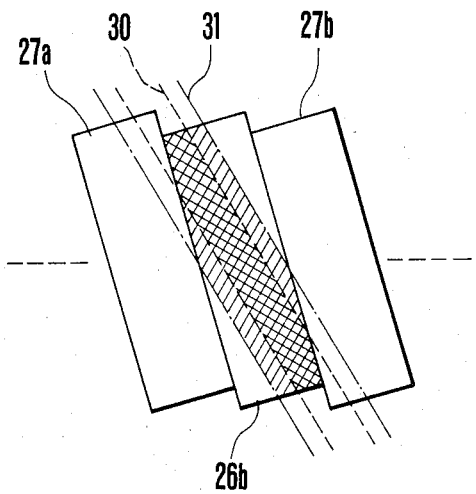
FIGS. 9(A) and 9(B) are illustrations showing a still picture image reproducing operation in the short-time mode of the VTR having the head arrangement as shown in FIG. 5.
Figure 9B:
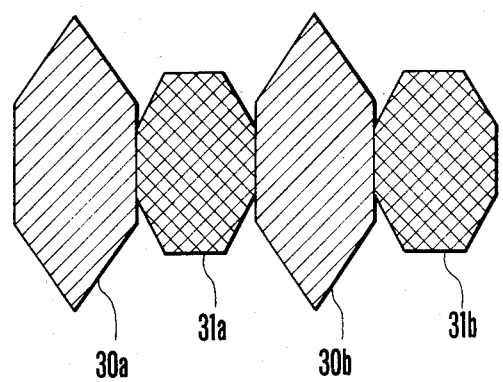

The tracing actions of the heads 15 and 19 which are performed in the still picture reproduction from tracks recorded in the short-time mode are shown in FIGS. 9(A) and 9(B). FIG. 9(A) shows a case where a still picture image is to be produced by repeatedly reproducing one field portion of a video signal recorded in a track 26b. In this drawing, one-dot chain lines 30 indicate the edges of a tracing locus of the head 15 and broken lines 31 the edges of that of the head 19. FIG. 9(B) shows the condition of reproduction outputs resulting from the tracing actions. The head 15 produces outputs 30a and 30b while the head 19 produces outputs 31a and 31b. As apparent from FIG. 9(B), there are also no extremely small output parts such as those mentioned above. Further, since the same track is traced, the arrangement also produces a sharp still picture image which is free from blur even in the case of tracks recorded in the short-time mode.

Theoretically, it is preferable to have the head 19 opposed to the heads 15 and 17 by arranging it 180° away from them. However, such arrangement is impossible with the structure of the rotating cylinder 20, which thus compels the head to be positioned away from the optimum position on the same circumference. Accordingly, the head 19 is preferably positioned between the heads 16 and 18. With the head 19 arranged in this manner, disorder of the picture can be minimized by shifting the use of the head 16 or 18 to the use of the head 19, that is, by effecting a change-over between normal reproduction and special reproduction.

Further, as shown in FIG. 6, the position of the head 19 on the above-stated circumference is preferably set at a distance mH from the head 16 and at a distance nH from the head 18. With this arrangement, the skew distortion which appears during special reproduction can be effectively minimized. In the above-stated distances mH and nH, the m and n represent positive integers.

The heads 16, 18 and 19 are arranged as close to each other as possible. With such arrangement, the wow, flutter and jitter which are usually caused by a protrudent head when it hits the tape can be minimized.

FIG. 10 shows an example of a VTR system having the heads arranged as shown in FIGS. 5 and 6 in accordance with this invention. The system operates as follows:

Referring to FIG. 10, the recording operation of the VTR system in the short-time mode is first described: A video signal supplied from an input terminal 38 is processed by a recording signal processing circuit 36 into a signal form suitable for recording. A change-over switch 35 has been shifted to one side F by a mode change-over circuit 44. The video signal produced from the recording signal processing circuit 36 is recorded on a magnetic tape by the heads 15 and 16 via a head change-over circuit 34. At that instant, the position of a change-over switch 32 has been shifted to one side A while that of another switch 33 has been shifted to one side C. Meanwhile, a switch 41 is connected to a side H. A vertical synchronizing signal which is separated at a vertical synchronizing separation circuit 42 is recorded as a signal CTL by a CTL head 40 and is also supplied to a drum drive control circuit 46 to control the rotation of a drum motor 48. The drum control is accomplished by phase control by comparing the phases of a drum phase detection signal (hereinafter called the signal PG) and the above-stated vertical synchronizing signal with each other. A capstan motor 47 on the other hand is arranged to have its rotational speed and phase adjusted to a reference signal produced from a reference oscillator which is not shown.

Recording in the long-time mode is performed in about the same manner as the recording operation in the short-time mode. In this instance, the change-over switches 32 and 33 are respectively shifted to sides B and D to allow the video signal to be recorded by the heads 17 and 18. As for the drum drive control, the drum motor 48 is controlled by comparing the phase of the vertical synchronizing signal with that of a signal PG which differs from the signal PG obtained in the short-time mode to an extent corresponding to a rotational phase difference between the heads 15 and 17. Meanwhile, the capstan drive control is carried out by adjusting the rotational speed and the phase of the capstan motor to the reference signal which is obtained in this instance, for example, through a frequency dividing process in such a manner as to render the travel speed of the motor slower than that of the tape in the short-time mode.

A normal reproducing operation in the short-time mode is carried out in the following manner: The switch 32 is shifted to the side A, the switch 33 to the side C and the switch 35 to the side G by the mode change-over circuit 44. A video signal reproduced by the heads 15 and 16 is supplied via the head change-over circuit 34 to a reproduced signal processing circuit 37, which processes the signal back to an original video signal. The video signal is then produced from an output terminal 39. A signal CTL reproduced by the head 40 is supplied to the capstan drive control circuit via the side I of the switch 41. The phase of the signal CTL is compared with that of a rotation detecting signal representative of the rotation of a fly-wheel or the like of the capstan. The capstan motor 47 is controlled by the result of this phase comparison. As for the drum drive control, the drum motor 48 is controlled by the result of phase comparison of the signal PG and the reference signal.

In normal reproduction in the long-time mode, a video signal reproduced by the heads 17 and 18 is supplied to the head change-over circuit 34 via the sides B and D of the switches 32 and 33. With the exception of that, the reproducing operation in the long-time mode is carried out in the same manner as in the normal reproducing operation in the short-time mode. The capstan is controlled in the same manner by means of the reproduced signal CTL and the rotation detection signal mentioned above. However, compared with the operation in the short-time mode, the signal CTL has been recorded at shorter intervals in this instance. Accordingly, the travel speed of the tape is made slower. Further, since the track width of the head differs from that of the short-time mode, the level of the reproduced signal supplied to the reproduced signal processing circuit differs from that of the short-time mode. In view of this, it is preferable to include some additional processes such as shifting the gain of a reproduction amplifier or shifting an emphasis circuit.

In the case of reproduction of a still picture image, the switch 32 is shifted to its side A for the short-time mode and to its side B for the long-time mode.

Further, the switch 33 is shifted to the side E. The drum control is performed in the same manner as in the normal reproducing operation. The capstan is controlled to bring the tape to a stop in a position as shown either in FIG. 8(B) or in FIG. 9(B). Usable methods for controlling the capstan include, for example, a method in which envelope detection or the like of the reproduced signal is carried out while allowing the tape to travel at a very low speed and then the stopping position of the capstan is determined by detecting the time at which a maximum output of the detection is obtained. Another method involves determining the stopping position means of a reproduced signal CTL. The first of these two methods is employed in the system of the embodiment shown in FIG. 10. Further, the head 19 produces the difference mH or nH in the video signal. Therefore, still reproduction, this difference is preferably corrected by some suitable means such as use of a delay line or the like.

The arrangement described above enables the head arrangement shown in FIG. 6 to be incorporated in a VTR, which is capable of giving the best picture quality by carrying out recording and reproducing operations in each of the long-time and short-time modes. Besides, the VTR according to the invention is capable of giving a reproduced still picture image of high quality.

While a reproducing operation for a still picture has been described in the foregoing as an example of special reproducing operations, a slow motion reproducing operation may be carried out in the following manner: A record in the same track is repeatedly reproduced by the head 19 and the head 15 or 17; and, after that, each of records in subsequent tracks is also repeatedly reproduced one after another.

In the video signal recording and reproducing apparatus according to the invention as described in the foregoing, the highest picture quality can be obtained by the efficient use of the recording medium in each of the different operation modes. It is another advantage of the invented VTR that a picture to be reproduced by varied speed reproduction such as a still reproduction picture or the like can be sharply reproduced without any blur.

What we claim:

1. A video signal recording and reproducing apparatus, comprising:
   a cylinder member arranged to have a tape-shaped recording medium wound thereon, the cylinder member including:
   a first rotating head;
   a second rotating head approximately equal to the first rotating head in head width and differing from the first rotating head in azimuth angle;
   a third rotating head having a narrower head width than the first rotating head and equal to the first head in azimuth angle;
   a fourth rotating head approximately equal to the third rotating head in head width and equal to the second rotating head in azimuth angle; and
   a fifth rotating head equal to the third rotating head in azimuth angle.

2. An apparatus according to claim 1, wherein said fifth rotating head is positioned to trace said tape-shaped recording medium alternately with said third rotating head.

3. An apparatus according to claim 2, wherein said fifth rotating head is positioned to trace said tape-shaped recording medium alternately with said first rotating head.

4. An apparatus according to claim 3, wherein said fifth rotating head is positioned between said second and fourth rotating heads.

5. An apparatus according to claim 4, wherein said fifth rotating head has a head width narrower than that of said first rotating head and wider than that of said third rotating head.

6. A video signal recording and reproducing apparatus, comprising:
   a cylinder member arranged to have a tape-shaped recording medium wound thereon, the cylinder member including:
   a first rotating head;
   a second rotating head approximately equal to said first rotating head in head width;
   a third rotating head having a narrower head width than the first rotating head;
   a fourth rotating head equal to said third rotating head in head width; and
   a fifth rotating head, the head width of which is narrower than that of said first rotating head and is wider than that of said third rotating head.

7. An apparatus according to claim 6, wherein said fifth rotating head is positioned to be able to trace said tape-shaped recording medium alternately with said third rotating head.

8. An apparatus according to claim 7, wherein said fifth rotating head is positioned to be able to trace said tape-shaped recording medium alternately with said first rotating head.

9. An apparatus according to claim 8, wherein, on said cylinder member, said first and third rotating heads are disposed adjacently to each other while said second, fourth and fifth rotating heads are disposed adjacent one another.

10. A video signal recording and reproducing apparatus, comprising:
    a cylinder member arranged to have a tape-shaped recording medium wound thereon, the cylinder member including:
    a first rotating head, a second rotating head approximately equal to said first rotating head in head width and differing from the first rotating head in azimuth angle, a third rotating head equal to said first rotating head in azimuth angle and differing from said first rotating head in head width, a fourth rotating head equal to said second rotating head in azimuth angle and approximately equal to said third rotating head in head width, and a fifth rotating head;

a first selection means for selecting one of said first and third rotating heads; and a second selection means for selecting one of said second, fourth and fifth rotating heads.

11. An apparatus according to claim 10, wherein said first selection means selects said first rotating head when said second selection means selects said second rotating head.

12. An apparatus according to claim 10, wherein said first selection means selects said third rotating head when said second selection means selects said fourth rotating head.

* * * * *